(12) United States Patent
Vasudevan et al.

(10) Patent No.: US 10,354,186 B2
(45) Date of Patent: Jul. 16, 2019

(54) MODIFYING COMPUTATIONAL GRAPHS

(71) Applicant: Google LLC, Mountain View, CA (US)

(72) Inventors: Vijay Vasudevan, Los Altos Hills, CA (US); Jeffrey Adgate Dean, Palo Alto, CA (US); Sanjay Ghemawat, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1 day.

(21) Appl. No.: 15/965,745

(22) Filed: Apr. 27, 2018

(65) Prior Publication Data

US 2018/0247198 A1 Aug. 30, 2018

Related U.S. Application Data

(63) Continuation of application No. 15/338,225, filed on Oct. 28, 2016.
(Continued)

(51) Int. Cl.
| | | |
|---|---|---|
| *G06F 15/18* | (2006.01) | |
| *G06N 3/08* | (2006.01) | |
| *G06F 9/50* | (2006.01) | |
| *G06F 9/54* | (2006.01) | |
| *G06N 3/063* | (2006.01) | |
| *G06F 17/16* | (2006.01) | |
| *G06N 3/04* | (2006.01) | |

(52) U.S. Cl.
CPC .......... *G06N 3/082* (2013.01); *G06F 9/5038* (2013.01); *G06F 9/5066* (2013.01); *G06F 9/547* (2013.01); *G06F 17/16* (2013.01); *G06N 3/04* (2013.01); *G06N 3/0454* (2013.01); *G06N 3/063* (2013.01); *G06N 3/084* (2013.01)

(58) Field of Classification Search
CPC ... G06F 17/30958; G06F 9/5038; G06N 3/08; G06T 1/20
See application file for complete search history.

(56) References Cited

U.S. PATENT DOCUMENTS

| | | | |
|---|---|---|---|
| 2006/0095722 A1 | 5/2006 | Biles et al. | |
| 2014/0282180 A1* | 9/2014 | Orofino | G06F 3/0484 715/771 |
| 2015/0007182 A1 | 1/2015 | Rossbach et al. | |

OTHER PUBLICATIONS

International Preliminary Report on Patentability issued in International Application No. PCT/US2016/059314, dated May 11, 2018, 9 pages.
(Continued)

*Primary Examiner* — Luis A Sitiriche
(74) *Attorney, Agent, or Firm* — Fish & Richardson P.C.

(57) ABSTRACT

Methods, systems, and apparatus, including computer programs encoded on computer storage media, for modifying a computational graph to include send and receive nodes. Communication between unique devices performing operations of different subgraphs of the computational graph can be handled efficiently by inserting send and receive nodes into each subgraph. When executed, the operations that these send and receive nodes represent may enable pairs of unique devices to conduct communication with each other in a self-sufficient manner. This shifts the burden of coordinating communication away from the backend, which affords the system that processes this computational graph representation the opportunity to perform one or more other processes while devices are executing subgraphs.

21 Claims, 8 Drawing Sheets

Related U.S. Application Data

(60) Provisional application No. 62/253,029, filed on Nov. 9, 2015, provisional application No. 62/247,713, filed on Oct. 28, 2015.

(56) References Cited

OTHER PUBLICATIONS

'www.wikipedia.com' [online] "Proxy Pattern," Sep. 5, 2015 [retrieved on Feb. 14, 2017] Retrieved from Internet: URL<URL:https://en.wikipedia.org/w/index.php?title=Proxy_pattern&oldid=679532202> 6 pages.

International Search Report and Written Opinion in International Application No. PCT/US2016/059314, dated Feb. 23, 2017, 14 pages.

\* cited by examiner

MODIFYING COMPUTATIONAL GRAPHS

CROSS-REFERENCE TO RELATED APPLICATIONS

This application is a continuation of U.S. application Ser. No. 15/338,225, entitled MODIFYING COMPUTATIONAL GRAPHS, filed on Oct. 28, 2016, which claims the benefit under 35 U.S.C. § 119(e) of the filing date of U.S. Patent Application No. 62/247,713, entitled MODIFYING COMPUTATIONAL GRAPHS, filed on Oct. 28, 2015, and claims the benefit of U.S. Patent Application No. 62/253,029, entitled MODIFYING COMPUTATIONAL GRAPHS, filed on Nov. 9, 2015. The disclosures of the prior applications are considered part of and are incorporated by reference in the disclosure of this application.

BACKGROUND

This specification relates to processing computational graphs representing neural networks.

Neural networks are machine learning models that employ one or more layers of models to generate an output, e.g., one or more classifications, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters for the layer.

The layers of a neural network can be processed by an individual device. The device can have a processor that performs operations, e.g., generating outputs at a layer from inputs, and stores outputs from the operations in memory. Due to the large number and size of operations generally required to generate the outputs in the neural network, one device can take a significant amount of time to process the layers of the neural network.

SUMMARY

In general, this specification describes a system for processing computational graphs representing neural networks and other machine learning models.

Particular embodiments of the subject matter described in this specification can be implemented so as to realize one or more of the following advantages. Operations of a neural network, e.g., operations to generate an inference from an input or to train the neural network, can be represented as a computational graph of nodes and directed edges. A system processes this computational graph representation to efficiently perform the operations of the neural network. By way of illustration, subgraphs of the computational graph can be assigned to unique devices, each of which performs operations in the respective subgraph, to reduce an overall time required to perform operations of the neural network. Communication between unique devices performing operations of different subgraphs of the computational graph can be handled efficiently by inserting send and receive nodes into each subgraph. When executed, the operations that these send and receive nodes represent may enable pairs of unique devices to conduct communication with each other in a self-sufficient manner. This shifts the burden of coordinating communication away from the backend, which affords the system that processes this computational graph representation the opportunity to perform one or more other processes while devices are executing subgraphs. Send and receive nodes serve to compartmentalize subgraphs in a manner that allows for a neural network or a portion of a neural network represented by such subgraphs to be trained on one device, and later on allocated to another device. For at least these reasons, modifying computational graphs to include pairs of send and receive nodes may help reduce time costs and the amount of network communication required to process a computational graph in a distributed fashion.

In some aspects, the subject matter described in this specification may be embodied in methods that may include the actions of obtaining data representing a computational graph, the computational graph including a plurality of nodes and directed edges, where each node represents a respective operation, and where each directed edge connects a respective first node to a respective second node that represents an operation that receives, as input, an output of an operation represented by the respective first node, obtaining data identifying an allocation of the computational graph across a plurality of devices, where the allocation assigns each node in the computational graph to a respective device of the plurality of devices, identifying one or more cross-device directed edges in the computational graph, where each cross-device directed edge is a directed edge that connects a respective first node to a respective second node that is assigned to a different device than the respective first node in the allocation, and for each cross-device directed edge, inserting a send node between the respective first node and the respective second node in the computational graph, inserting a receive node between the send node and the respective second node in the operation graph, and modifying the allocation to assign the send node to the same device as the respective first node and the receive node to the same device as the respective second node, and assigning the operations represented by the nodes in the computational graph to the plurality of devices according to the modified allocation.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, the send node may represent an operation that (i) receives, as input, an output of the operation represented by the respective first node, and (ii) provides the output of the operation represented by the respective first node, as output, to the receive node, and the receive node may represent an operation that (i) receives, as input, the output of the operation represented by the send node, and (ii) provides the output of the operation represented by the send node, as output, to the respective second node. In some implementations, the operation represented by the receive node may further (iii) provide requests for output of the operation represented by the send node, as output, to the send node, and the operation represented by the send node may further (ii) provide the output of the operation represented by the respective first node, as output, to the receive node in response to one or more requests received from the receive node. In some examples, the output of the operation represented by the respective first node may include a tensor.

In some implementations, obtaining data identifying the allocation of the computational graph across the plurality of devices may include obtaining data identifying an allocation of the computational graph across hardware resources included in one or more machines. In these implementations, each node in a pair of send and receive nodes may, for instance, represent an operation that receives, as input, an output of the operation represented by the other node in the pair communicated according to a protocol that corresponds to each hardware resource and machine to which the pair of send and receive nodes are assigned.

In some examples, inserting the send node between the respective first node and the respective second node in the computational graph further may include, for each cross-device directed edge, inserting a directed edge between the send node and the respective first node. In addition, inserting the receive node between the send node and the respective second node in the operation graph further may include, for each cross-device directed edge, inserting a directed edge between the receive node and the respective second node.

In some implementations, during execution of the operations represented by the computational graph by the plurality of devices, the operations represented by each pair of send and receive nodes may allow the plurality of devices to independently communicate inputs and outputs of operations represented by other nodes in computational graph across devices in the plurality of devices. In some examples, data may be independently exchanged between operations represented by each node in a pair of send and receive nodes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
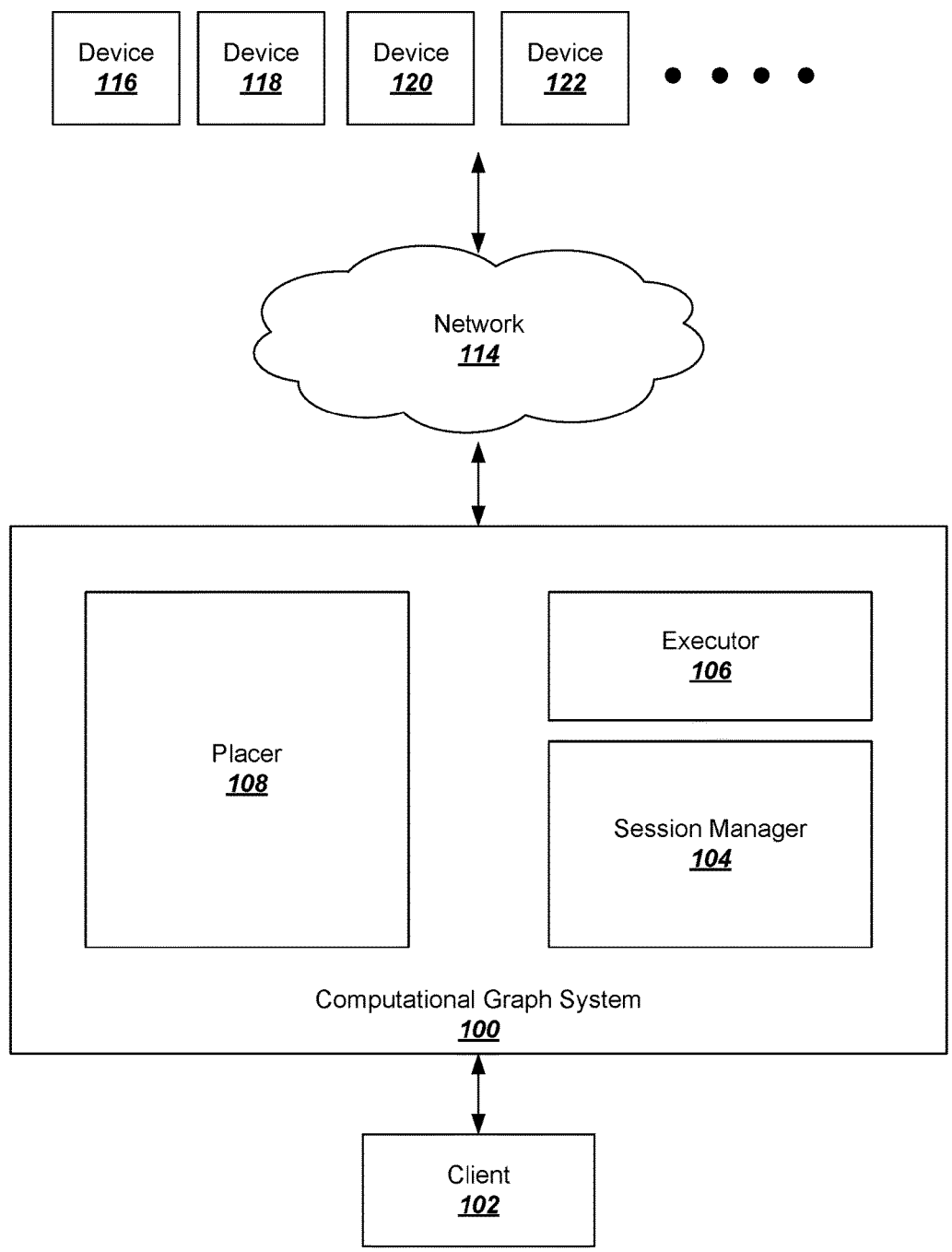
FIG. 1A illustrates an example computational graph system for distributing operations for neural networks represented as computational graphs.

This specification generally describes a computational graph system that performs operations represented by a computational graph in a distributed manner. Particularly, this specification describes techniques for modifying computational graphs in a manner which enables seamless communication between devices. Such techniques may help to ensure that each computational graph is collectively executed by multiple devices in an expeditious and effective manner.

The computational graph includes nodes connected by directed edges. Each node in the computational graph represents an operation. An incoming edge to a node represents a flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

Generally, the input and outputs flowing along directed edges in the computational graph are tensors. A tensor is a multidimensional array of numeric values or other values, e.g., strings, having a specific order that corresponds to the dimensionality of the array. For example, a scalar value is a 0th-order tensor, a vector of numeric values is a 1st-order tensor, and a matrix is a 2nd-order tensor.

In some implementations, the operations represented in the computational graph are neural network operations or operations for a different kind of machine learning model. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the network generate an output from a received input in accordance with current values of a respective set of parameters, while other layers of the network may not have parameters.

For example, the operations represented by the computational graph may be operations necessary for the neural network to compute an inference, i.e., to process an input through the layers of the neural network to generate a neural network output for the input. As another example, the operations represented by the computational graph may be operations necessary to train the neural network by performing a neural network training procedure to adjust the values of the parameters of the neural network, e.g., to determine trained values of the parameters from initial values of the parameters. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, this matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., SoftMax, Sigmoid, rectified linear unit (ReLU), or convolutions.

Representing a neural network as a computational graph provides for a flexible and granular way to efficiently implement the neural network, especially if the operations for the neural network are distributed across multiple devices with different hardware profiles.

FIG. 1A illustrates an example computational graph system 100 for distributing operations for neural networks represented as computational graphs. The system 100 is an example of a system implemented as computer programs on one or more computers in one or more locations, in which the systems, components, and techniques described below can be implemented.

A user of a client 102 can request operations be performed on a computational graph representing a neural network. The client 102 can be an application running on a computer.

As part of the request, the client 102 provides data identifying a computational graph to the system 100 and specifies types of operations to be performed on the computational graph.

For example, the request can identify a computational graph representing an inference for a particular neural network and can identify an input on which the inference should be performed.

As another example, the request can identify a computational graph representing a training procedure for a particular neural network and can identify an input, such as training data, on which the training should be performed. In this example, when receiving a request to process a computational graph representing a training procedure, the system 100 can determine modified values for parameters for one or more edges of the computational graph, e.g., using conventional backpropagation or other neural network training techniques. The system 100 can store the modified parameters in memory of a device, and an executor 106 can retrieve and store, at the system 100, addresses of the modified weights. Upon further requests from the client 102 for inference, training, or other operations requiring the modified weights, the system 100 can access the modified weights using the addresses.

In some cases, the request may specify a response that should be transmitted in response to the request. For example, for a neural network training request, the client 102 can request an indication that the requested neural network training operations have been completed and, optionally, trained values of the parameters of the neural network or an indication of a memory location from which the trained values can be accessed by the client 102. As another example, for a neural network inference request, the client 102 can request output values that represent an inference operation from one or more particular nodes of the computational graph.

The system 100 performs the operations to generate the particular output by partitioning the operations represented by the computational graph across multiple devices 116-122. The system 100 partitions the operations to the multiple devices 116-122 over a data communication network 114, e.g., local area network (LAN) or wide area network (WAN). The devices 116-122 perform the operations and, if applicable, return a respective output or indication to the system 100, which can return the requested output or indication to the client 102.

Any devices performing neural network operations, e.g., devices 116-122, can include a memory, e.g., a random access memory (RAM), for storing instructions and data and a processor for executing stored instructions. Generally, each device is a hardware resource that performs operations independent of other devices. For example, each device can have its own processing unit. The devices can be Graphical Processing Units (GPUs) or Central Processing Units (CPUs). By way of illustration, one machine can host one or more devices, e.g., multiple CPUs and GPUs. Examples of such devices and machines can be seen in FIG. 1B.

Figure 1B:
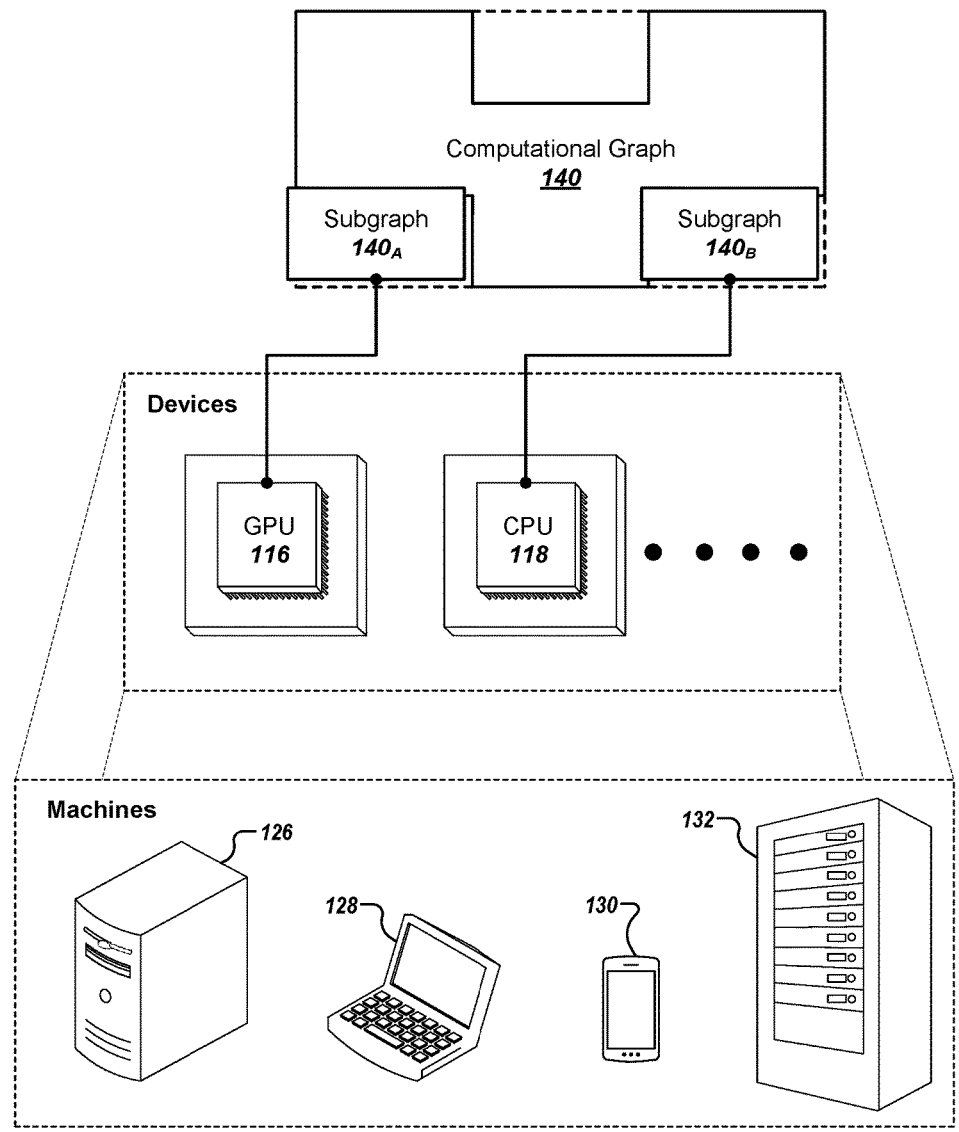
FIG. 1B is a conceptual diagram for an exemplary framework for distributing operations for neural networks represented as computational graphs in a system.

FIG. 1B is a conceptual diagram for an exemplary framework for distributing operations for neural networks represented as computational graphs in the system 100. Referring now to FIG. 1B, examples of machines may include a computing device 126, personal computer 128, mobile device 130, and server 132. Each machine may, for example, include one or more devices, such as GPU 116 and CPU 118.

Each device can also have a respective computational capability. That is, devices can have different amount of memories, processing speed, or other architectural characteristics. Thus, some devices can perform operations that other devices cannot. For example, some operations require a certain amount of memory that only particular devices have, or some devices are configured to only perform a particular type of operation, e.g., inference operations.

Referring again to FIG. 1A, a session manager 104 in the system 100 may receive a request from the client 102 to start a session during which operations of the computational graph are performed. The session manager 104 manages the set of devices, e.g., devices 116-122, that can perform operations of the computational graph, and can provide a placer 108 with the set of devices that are available to perform operations.

The placer 108 determines, for each operation to be performed in the computational graph, a respective target device, e.g., device 116, that performs the operation, and in some implementations, a time for the respective target device to perform the operation. Some operations can be performed in parallel while other operations require prior operations in the computational graph to be completed, e.g., the other operations process, as inputs, outputs of the prior operations.

After the devices perform the operations allocated by the placer 108 to generate outputs, the executor 106 can retrieve the outputs. The executor 106 can generate an appropriate response to the request, e.g., an output or an indication that the processing has been completed. Then, the executor 106 can return the response to the client 102.

The session manager 104 also provides sets of operations to be performed in the computational graph to the executor 106. The executor 106 periodically retrieves runtime statistics from the devices 116-122 related to graph execution of operations. The executor 106 provides the runtime statistics to the placer 108, which can re-optimize placement and scheduling of further operations.

In operation, the system 100 may receive a request from a client 102 to process a computational graph. For example, the request can be a request to perform a neural network inference represented by the computational graph on a specified input, a request to perform neural network training operations represented by the computational graph on a specified set of training data, or a request to perform other neural network operations represented by the computational graph, as described above.

Upon receipt of the request, the system 100 may obtain data representing the computational graph. In some cases, the data is sent with the request from the client. In other cases, the request identifies the computational graph and the system 100 retrieves the data representing the identified graph from memory. By way of illustration, the data representing the graph can be an array of the nodes in the graph. Each node can contain information specifying an operation type, a name, and a list of incoming and outgoing edges to the node.

The system 100 may identify multiple available devices for performing the requested operation. A device may be considered busy if the device is currently performing other operations and cannot be assigned further operations or is otherwise unavailable to perform graph processing operations. The device may be considered available if the device can be assigned further operations, e.g., the further operations can be queued for operation by the device.

The system 100 may partition the computational graph into multiple subgraphs. Each subgraph includes one or more nodes in the computational graph. The system 100 may, in some examples, obtain these subgraphs by breaking up pairs of nodes in the computational graph that are adjacent to each other, but are assigned to different devices.

The system 100 may assign, for each subgraph, the operations represented by the one or more nodes in the subgraph to a respective available device. In some implementations, the system 100 may assign each subgraph to a device having a computational capability necessary to perform the operations represented by the nodes in the subgraph. In some implementations, the request from the client includes data specified by a user that identifies a particular type of device to perform operations for particular nodes.

Thus, the system 100 generates an allocation of the computational graph across multiple devices that assigns each node in the computational graph to a respective device of the multiple devices. Each subgraph includes a given group of one or more nodes in the computational graph which, as described above, may be assigned to the same device. An exemplary subgraph to device mapping can be seen in FIG. 1B. In this example, exemplary subgraphs $140_A$ and $140_B$ of computational graph 140 may be allocated to GPU 116 and CPU 118, respectively. GPU 116 and CPU 118 may reside in a different or a same one of machines 126-132. In operation, GPU 116 and CPU 118 may perform the operations represented by the nodes included in the subgraph that the system 100 has assigned to them.

The system 100 may cause the devices to perform the operations of the nodes included in the subgraphs respectively assigned to the devices. In some implementations, the system 100 may send each device a request to start the operations of the nodes included in the subgraph assigned to the respective device. In response to receiving such a request from the system 100, each device may proceed to perform the operations of the nodes included in the subgraph assigned to the device.

Given that various dependencies may exist between nodes and groups of nodes in the computational graph, it follows that communication between various devices will need to be coordinated in order for such devices to be able to collectively execute the computational graph. For example, a node that represents an operation being executed on a first device may receive, as input, an output of another node that represents an operation being executed on a second, remotely located device. In this example, communication of the output of the operation represented by the other node from the second device to the first device may need to be coordinated in an effective manner in order to ensure proper and timely execution of the computational graph.

In some examples, the devices may coordinate exchanges of inputs and outputs with one another, as necessary. In these examples, the communication between the devices may occur independent of the system 100. That is, the system 100 may send each device a request to execute the operations of its respective subgraph and, in response to the request, each device may proceed to execute the operations of its respective subgraph in response to the system 100's request, which may include coordinating communication with other devices without additional intervention by the system 100.

In some implementations, to allow the devices to communicate independently of the system 100, the system 100 modifies the computational graph such that it includes additional nodes that represent communication operations between nodes. In particular, a device's respective subgraph may include a node representing an operation which, when executed by the device, allows the device to seamlessly communicate with another device that is executing a counterpart operation.

More particularly, the system 100 may insert "send" and "receive" nodes into the computational graph. Each send node represents an operation in which data, such as a tensor, is relayed to a receive node that is assigned to a different device than that of the send node. The system 100 may determine the locations in the graph at which to insert pairs of send and receive nodes by identifying any cross-device directed edges in the graph. Cross-device directed edges are directed edges in the computational graph that connect nodes in the computational graph that are to be allocated to two different devices. The system 100 may identify such cross-device directed edges while or after determining the allocation of the computational graph. Upon identifying each cross-device directed edge included in the graph, the system 100 may modify the computational graph by splitting each cross-device directed edge and inserting a pair of send and receive nodes in place of the cross-device directed edge. This modification process is described further below in reference to FIGS. 2A-C.

Figure 2A:
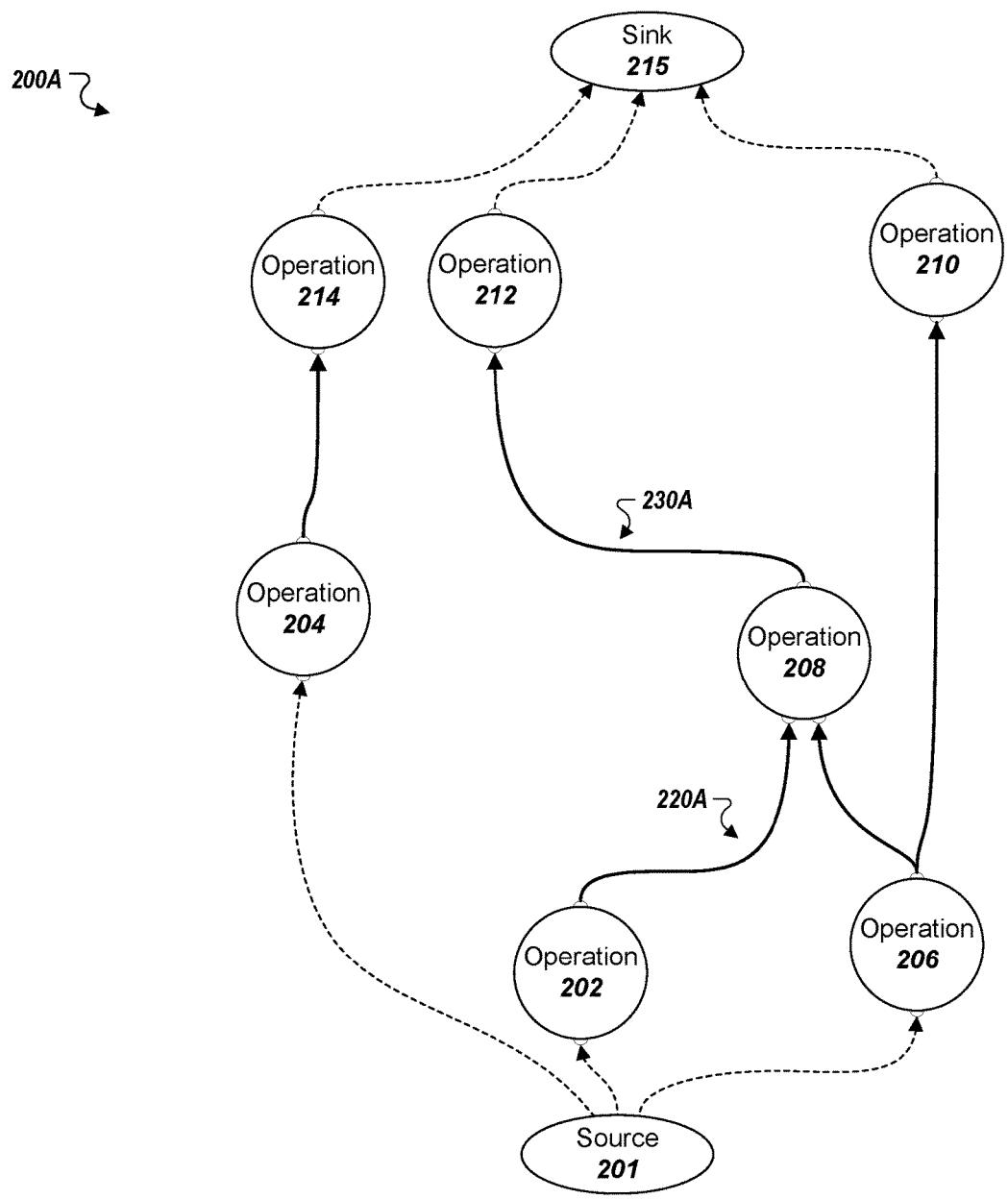
FIGS. 2A-C are example computational graphs.
Figure 2B:
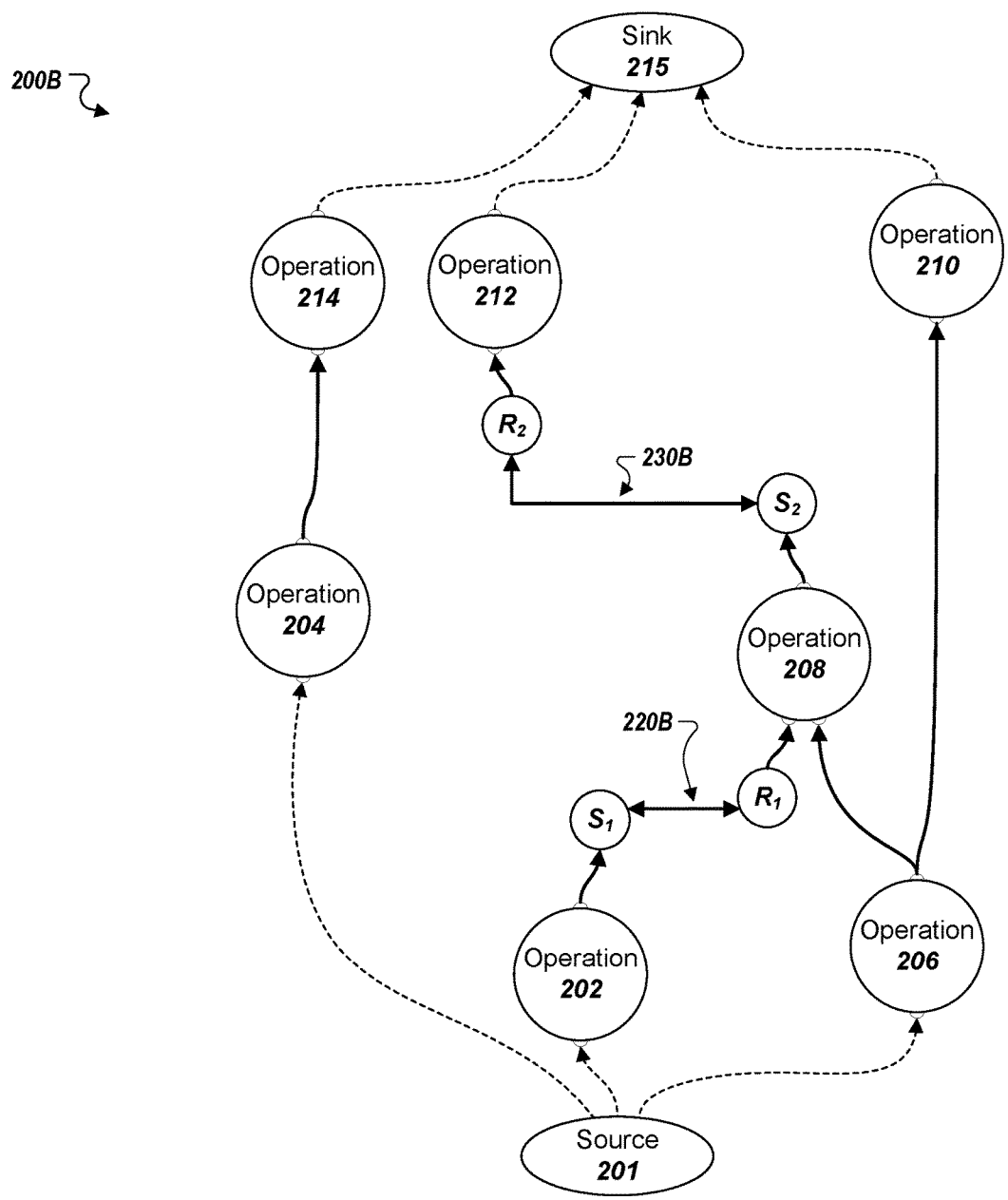
Figure 2C:
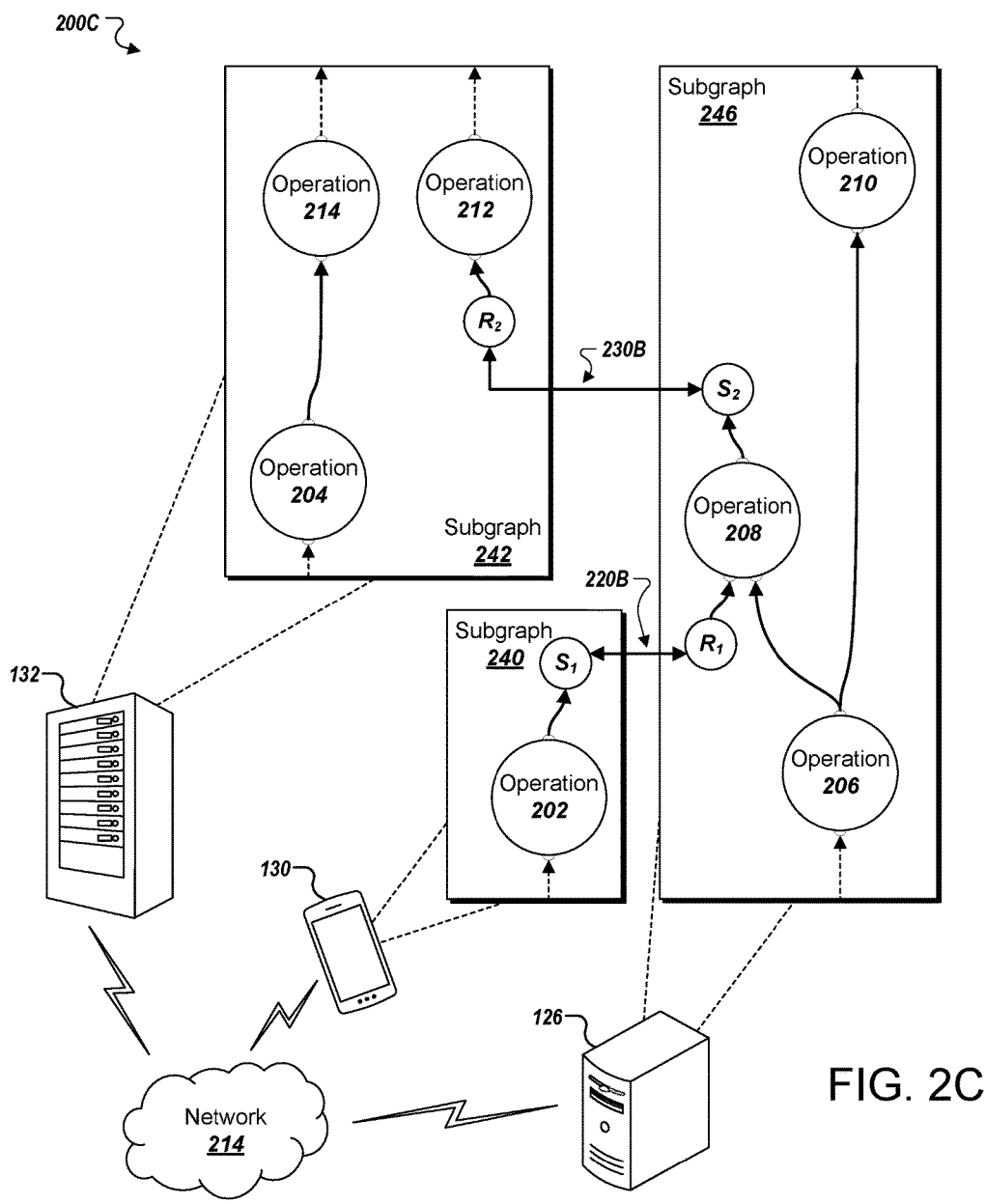

FIGS. 2A-C illustrate example computational graphs. By way of example, a computational graph system, e.g., the system 100 of FIG. 1A, can receive a request from a client to, given a set of inputs, compute an inference using the computational graph 200A. The computational graph 200A may receive input from an exemplary source 201 and provide output to an exemplary sink 215. The exemplary source 201 and sink 215 may, for example, be one or more other nodes of the computational graph.

The system may, for instance, determine to allocate computational graph 200A across three different devices. To make this determination the system may analyze the computational graph 200A to identify one or more nodes that can be partitioned into subgraphs and allocated to the devices available. For example, the system may determine to allocate a first chain formed by nodes 204 and 214 to a first device, a second chain formed by nodes 206, 208, and 210 to a second device, and node 202 to a third device. Although other possible chains of nodes are possible, the system can select the chains that minimize the number of subgraphs.

Under this particular allocation, the system may identify directed edges 220A and 230A as being cross-device directed edges. That is, the system may recognize that directed edges 220A and 230A each connect nodes that the system has determined to allocate to different devices. For example, it can be seen that directed edge 220A connects node 202 to node 208, which the system has determined to allocate to third and second devices, respectively. Similarly, directed edge 230A crosses device boundaries by extending from node 208, which corresponds to the second device, to node 212, which corresponds to the first device.

In response to identifying each cross-device directed edge included in computational graph 200A, the system may proceed to modify the computational graph 200A to generate a modified computational graph, e.g., the modified computational graph 200B illustrated in FIG. 2B. More particularly, the system may insert a pair of send and receive nodes between nodes 202 and 208 in place of directed edge 220A. In similar fashion, the system may also insert a pair of send and receive nodes between nodes 208 and 212 in place of directed edge 230A. It can be seen that directed edges are also inserted between each send or receive node and each node adjacent to such send or receive node.

Referring now to FIG. 2B, it can be seen that modified computational graph 200B, which represents a version of the computational graph 200A as modified by the system, includes a two pairs of send and receive nodes. Specifically, a first send node, $S_1$ has been inserted between nodes 202 and 208, and a corresponding first receive node, $R_1$ has been inserted between the first send node $S_1$ and node 208. By these insertions, the system allocates the first send node $S_1$ to the same device as node 202 (i.e., the third device) and allocates the first receive node $R_1$ to the same device as node 208 (i.e., the second device). A bidirectional bridge 220B connects the first send node $S_1$ to the first receive node $R_1$. The bridge 220B can be seen as representing a communication channel between the first send node $S_1$ and the first receive node $R_1$.

When executed, the operations represented by the first send node $S_1$ and the first receive node $R_1$ enable the second and third devices to communicate in a predetermined manner. For example, execution of such operations may include the second and third devices adhering to a particular communication protocol. Address information of each respective device and/or node being executed by each respective device may also be built into these operations. In this way, the first send node $S_1$ and the first receive node $R_1$ may encapsulate every communication process that may need to be performed between the second and third devices in order for their respective subgraphs to be satisfactorily executed. These communication processes are described further below in reference to FIGS. 3 and 4A-B.

Similarly, a second send node, $S_2$ has been inserted between nodes 208 and 212, and a corresponding second receive node, $R_2$ has been inserted between the second send node $S_2$ and node 212. By these insertions, the system allocates the second send node $S_2$ to the same device as node 208 (i.e., the second device) and allocates the first receive node $R_1$ to the same device as node 208 (i.e., the first device). A bidirectional bridge 230B connects the second send node $S_2$ to the second receive node $R_2$, and can be can be seen as representing a communication channel between the second send node $S_2$ and the second receive node $R_2$. Much like the first send node $S_1$ and the first receive node $R_1$, the second send node $S_2$ and the second receive node $R_2$ enable communication to be easily coordinated between the second and first devices.

As demonstrated by the modified computational graph 200C in FIG. 2C, the system 100 may modify the allocation such that each send node is allocated to one respective subgraph and each receive node is allocated to another respective subgraph. For instance, the first send node $S_1$ may be allocated to third device included in machine 130, along with node 202, as part of subgraph 240 that the system has assigned to the third device. Similarly, the first receive node $R_1$ and second send node $S_2$ may be allocated to the second device included in machine 126, along with nodes 206, 208, and 210, as part of subgraph 246 that the system has assigned to the second device. Furthermore, the second receive node $R_2$ may be allocated to the first device included in machine 132, along with nodes 204, 212, 214, as part of subgraph 242 that the system has assigned to the first device.

At execution time, the operation represented by the first send node $S_1$ may include a relaying of the output of node 202 to the first receive node $R_1$. This exchange may occur, for example, by way of channel 220B over a network 214 to which machines 130 and 126 have access. Network 214 may be similar to network 114 as described above in association with FIG. 1. The protocol leveraged to conduct this communication may be reflected in the operations represented by the first pair of send and receive nodes $S_1$ and $R_1$, and may depend on one or more characteristics of the devices, machines, nodes, and networks associated with the execution of subgraphs 240 and 246. The operation represented by the first receive node $R_1$ may, in turn, include a passing of the output of the operation represented by node 202 that it receives from the first send node $S_1$ along as an input to node 208.

Similarly, the operation represented by the second send node $S_2$ may include a relaying of the output of the operation represented by the node 208 to the second receive node $R_2$. This exchange may occur, for example, by way of channel 230B over the network 214 to which machines 132 and 126 have access. The protocol leveraged to conduct this communication may be reflected in the operations represented by the second pair of send and receive nodes $S_2$ and $R_2$, and may depend on one or more characteristics of the devices, machines, nodes, and networks associated with the execution of subgraphs 246 and 242. The operation represented by the second receive node $R_2$ may, in turn, include a passing of the output of the operation represented by the node 208 that it receives from the second send node $S_2$ along as an input to node 212.

Figure 3:
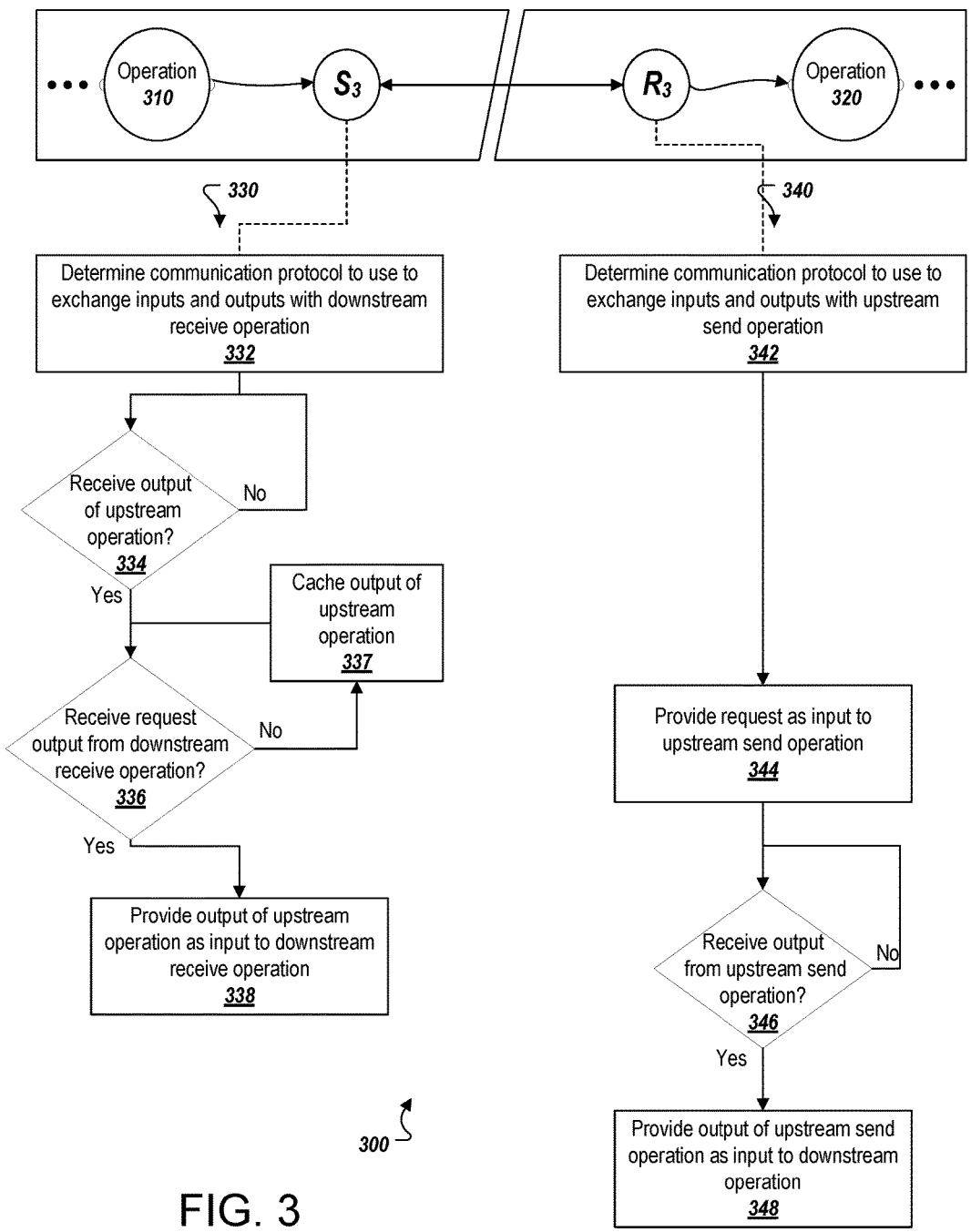
FIG. 3 is a flow diagram of an example process provided through execution of exemplary send and receive nodes included in a computational graph.

FIG. 3 is a flow diagram of an example process 300 provided through execution of exemplary send and receive nodes included in a computational graph. For convenience, the process 300 will be described as being performed by a system of one or more computers located in one or more locations. The computational graphs and operations described in association with process 300 may those which have been described above. For example, the process 300 may be performed through the execution of one or more portions of a computational graph as provided by system 100 as described above in association with FIG. 1.

As mentioned above, the operations represented by send and receive nodes may yield bidirectional communication between the devices to which they are assigned. Operations 330 and 340 represented by send and receive nodes $S_3$ and $R_3$, respectively, may initially include a determination of a communication protocol to use for such bidirectional communication (332 and 342). The communication protocols leveraged by operations represented by pairs of send and receive nodes may depend on one or more characteristics of the devices, machines, nodes, and networks associated with the execution of the subgraphs at hand. This determination process is described further below in reference to FIGS. 3A-B.

The operations 330 represented by send node S$_3$ may then act to determine whether output of an operation of upstream node 310 has been provided (310). Such output may include a tensor produced by way of execution of a subgraph that includes node 310 and send node S$_3$ by an assigned device. Once provided, operations 330 represented by send node S$_3$ may act to provide the output of the operation represented by node 310 as input to the operations 340 represented by receive node R$_3$, which may in turn act to provide the same as input to the operation represented by node 320.

Execution of operations 340 represented by receive node R$_3$ may involve sending one or more messages to that of corresponding send node S$_3$ (344). Such messages may serve as indication that the subgraph to which the receive node R$_3$ belongs is ready to receive input by way of execution of corresponding send node S$_3$. In this way, these messages can be seen as a request to receive data output by one or more upstream operations. In the example of FIG. 3, the operations 340 represented by receive node R$_3$ may receive input from send node S$_3$ that includes the output of the operation represented by node 310.

At execution, the operations 330 represented by send node S$_3$ may include a relaying of data in response to receipt of such messages. In some examples, the operations 330 represented by send node S$_3$ may not act to relay the output of the operation represented by node 310 until such a message has been received (336). In this way, the flow of information between devices may be regulated so as to ensure that tensors are successfully exchanged. In these examples, the output of the operation represented by node 310 may be cached or otherwise stored in one or more memory regions local to the device that is executing the send node S$_3$ (337). In some implementations, this output of the operation may be stored elsewhere on a machine to which the device belongs, or on one or more network-accessible devices. Once a receive node message is received, the stored output of the operation may be communicated to the party associated with receive node R$_3$ (336 to 338) and subsequently flushed or otherwise deleted from memory. Upon determining that output from the operation represented by send node S$_3$ has been received as input (346), the operations represented by receive node R$_3$ may act to provide such output as input to the operation represented by downstream node 320 (348).

It can be seen that, through the execution of operations 330 and 340 as represented by send and receive nodes S$_3$ and R$_3$, respectively, all data exchanges required for the execution of the associated subgraphs may be coordinated and carried out by the devices executing the subgraphs. The communicative autonomy provided to pairs of devices executing operations 330 and 340 may serve to shift the burden of coordinating communication away from the backend. In this way, a computational graph system, such as system 100, may be able to perform one or more other processes while devices are executing subgraphs, rather than actively regulate communication between such devices. For at least this reason, modifying computational graphs to include pairs of send and receive nodes may help reduce time costs and the amount of network communication required to process a computational graph in a distributed fashion.

In some implementations, operations 330 and 340 as represented by send and receive nodes S$_3$ and R$_3$ may be leveraged in handling all incoming and/or outgoing communications of a given device. For example, the operations 340 represented by receive node R$_3$ may act to receive incoming communication from operations 330 represented by send node S$_3$, as well as from operations represented by one or more other send nodes. Similarly, the operations 330 represented by send node S$_3$ may act to provide outgoing communications as input to operations 340 represented by receive node R$_3$, as well as to operations represented by one or more other receive nodes. In this way, operations 330 and 340 represented by send and receive nodes S$_3$ and R$_3$ may act to provide hub-like functions to the devices to which they are assigned.

Send and receive nodes S$_3$ and R$_3$ may serve to compartmentalize subgraphs in a manner that allows for a neural network or a portion of a neural network represented by such subgraphs to be trained on one device, and later on allocated to another device. Send and receive nodes S$_3$ and R$_3$ may also allow neural networks or portions of neural networks represented by one or more subgraphs to be trained or tested in new ways. For example, the operations 340 represented by receive node R$_3$ may provide an input to the operation represented by node 320 that simulates a tensor being output by the operation represented by node 310 in order to train one or more portions of the computational graph downstream from the receive node R$_3$. In some implementations, a client device, such as client device 102 described above in reference to FIG. 1, may be leveraged to provide receive node R$_3$ with such an input. In these implementations, the client device may execute an operation represented by a specialized node that provides a predetermined tensor as output to operations 330, which may also be executed on the client device. Such a specialized node can be seen as a substitute for nodes that are upstream in a computational graph from that of receive node R$_3$ and node 320. In this way, users may be able to remotely test and/or train a neural network or a portion of a neural network represented by one or more downstream subgraphs by executing an operation represented by a specialized node and operations 330 on their client device. The tensor output by an operation represented by a specialized node of this type may, for example, be static, user-defined, randomly generated, or determined based on one or more characteristics of the devices, machines, nodes, and networks associated with the execution of the subgraphs at hand.

In some implementations, data exchanged between devices in association with send and receive nodes S$_3$ and R$_3$ may be compressed. That is, the operations 330 represented by send node S$_3$ may act to perform one or more compression processes upon the output of the operation represented by node 310. Similarly, the operations 340 represented by receive node R$_3$ may act to perform one or more decompression processes upon compressed data provided as output by way of execution of the operations 330 represented by send node S$_3$. The compression operations performed may include any conventional compression algorithm that is appropriate for transmitting data between the two devices. For example, the data exchanged between devices may be downconverted, truncated, or a combination thereof. Similarly, values conveyed by such data may also be subject to probabilistic rounding. Such compression operations may be selected based on one or more characteristics of the devices, machines, nodes, and networks associated with the execution of the subgraphs at hand. For example, compression operations may be selected based on the machine learning model's noise tolerance. Although compression has been described in association with operations 330 and 340, it is to be understood that such operations may leverage any of various signal processing and conditioning techniques.

Figure 4A:
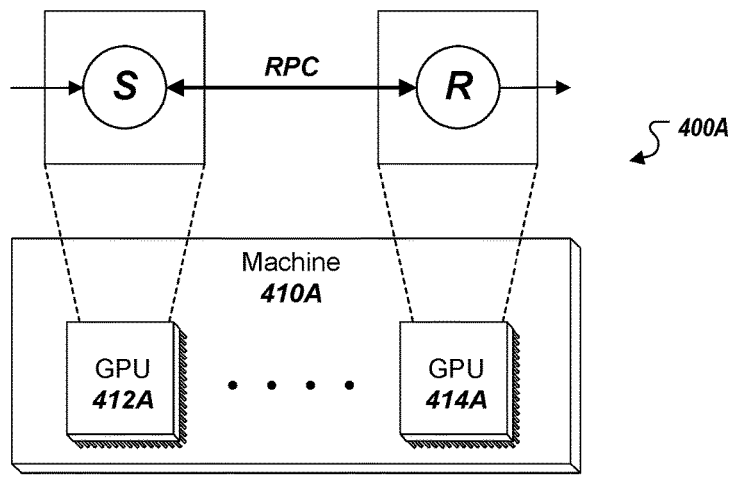
FIGS. 4A-B are exemplary portions of computational graphs as allocated to devices.
Figure 4B:
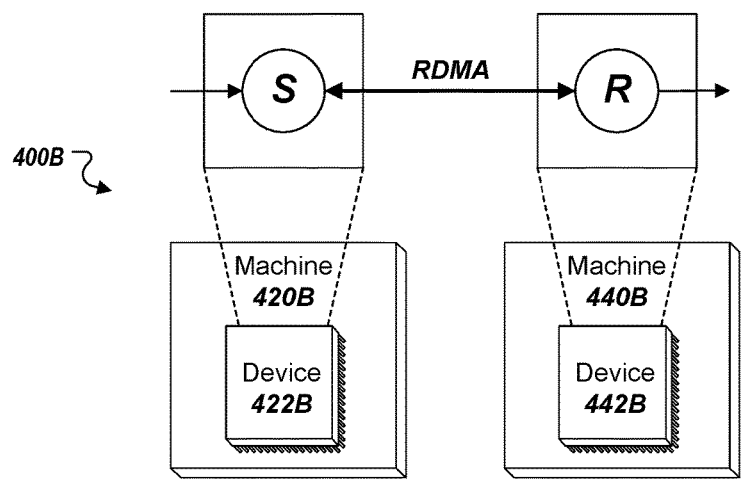

As described above, the communication protocols leveraged by operations represented by pairs of send and receive nodes may depend on one or more characteristics of the devices, machines, nodes, and networks associated with the execution of the subgraphs at hand. FIGS. 4A-B depict two portions of computational graphs 400A and 400B that include send and receive nodes and are allocated to devices. It can be seen that the send node included in computational graph 400A has been assigned to device 412A, which in this example is a GPU, and that the receive node included in computational graph 400A has been assigned to device 414A, which in this example is also a GPU. In this example, GPU 412A and GPU 414A reside within a same machine 410A. Since devices that the send and receive nodes of computational graph 400A are both GPUs and both reside within a same machine 410A, it may be advantageous for their exchanges to be conducted under a remote procedure call (RPC) or other localized request/response protocol.

In some implementations, the particular communication protocol to be used may be determined through execution of the operations represented by send and receive nodes after subgraph allocation. Such determinations may be made, for instance, on the basis of address information known to these operations. In this example, GPU 412A and GPU 414A may execute operations associated with the send and receive nodes which indicate that the two devices both reside within machine 410A, and subsequently coordinate communications under RPC. In other implementations, a communication protocol may be predetermined and indicated within the operations represented by each send and receive node at the time of their insertion. In these implementations, each communication protocol may be determined in a manner similar to that which has been described above.

It can be seen that the send node included in computational graph 400B has been assigned to device 422B, which may be a CPU or GPU, and that the receive node included in computational graph 400B has been assigned to device 442B, which may also be a CPU or GPU. Device 422B may reside with machine 420B and device 442B may reside with machine 440B. A communication protocol may be determined for these devices through the use of techniques similar to those which have been described above. In this example, exchanges between devices 422B and 442B may be conducted under a remote direct memory access (RDMA) protocol. This protocol may be advantageous for devices of two different machines in that it permits communications to be conducted without involving the operating systems associated with each device. In this example, devices 422B and 442B may execute operations associated with the send and receive nodes which indicate that the two devices reside in different devices, and subsequently coordinate communications under RDMA.

Figure 5:
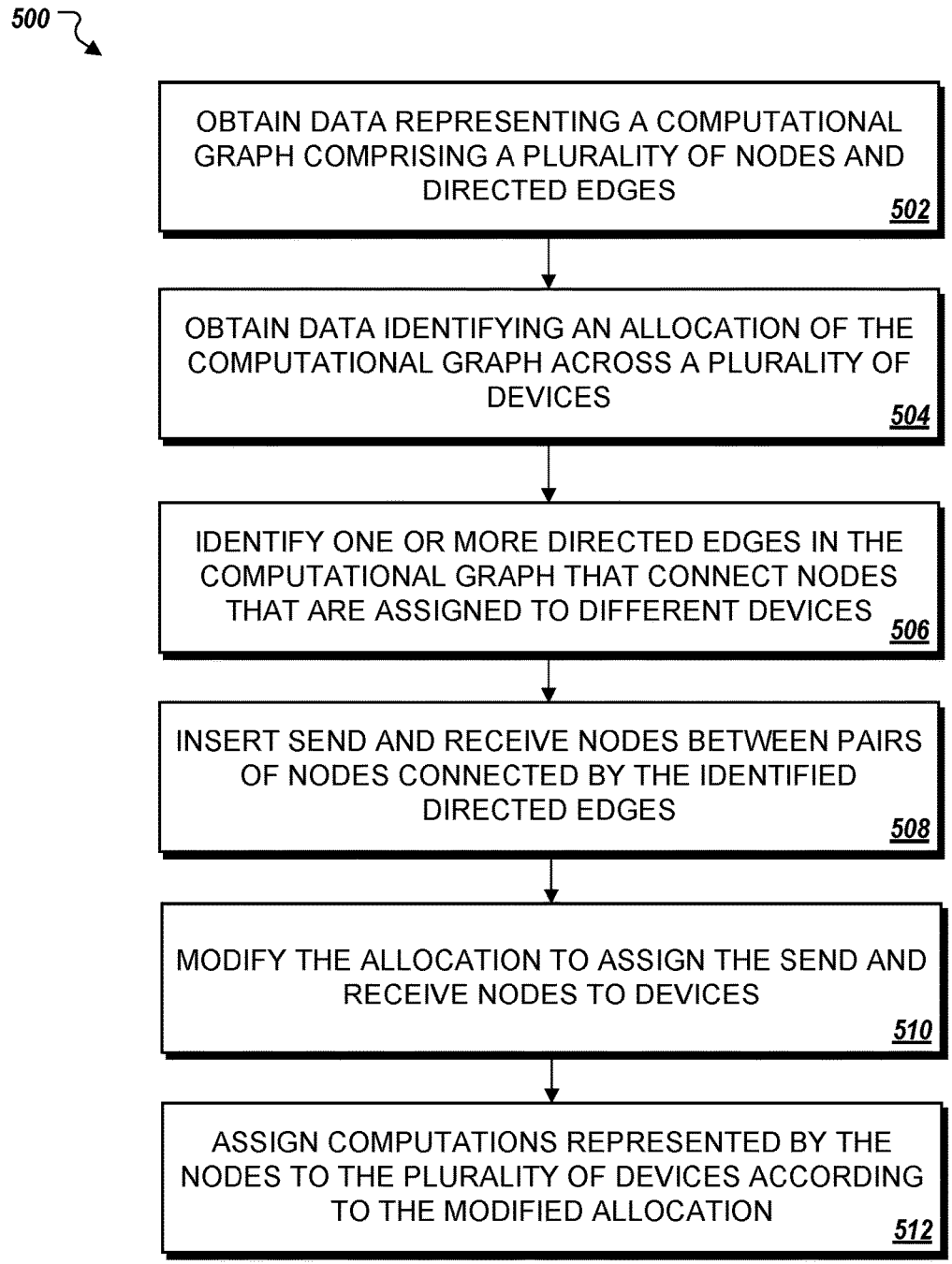
FIG. 5 is a flow diagram of an example process for modifying a computational graph.

FIG. 5 is a flow diagram of an example process 500 for modifying a computational graph to include send and receive nodes. For convenience, the process 500 will be described as being performed by a system of one or more computers located in one or more locations. For example, a computational graph system, e.g., the computational graph system 100 of FIG. 1A, appropriately programmed, can perform the process 500.

The system may obtain data representing a computational graph that includes multiple nodes and directed edge (502). For example, a computational graph may be obtained by a computational graph system after a receiving a request from one or more client devices. In some examples, each node in the computational graph is an instantiation of an operation.

The system may obtain data identifying an allocation of the computational graph across multiple devices (504). For example, a computational graph system may determine how each node included in the obtained computational graph is to be assigned across multiple available devices. In some implementations, this may include obtaining data identifying an allocation of the computational graph across hardware resources included in one or more machines.

The system may identify one or more directed edges in the computational graph that connect nodes that are assigned to different devices (506). For example, a computational graph system may identify one or more cross-device directed edges.

The system may insert send and receive nodes between pairs of nodes connected by the identified directed edges (508). For example, a computational graph system may replace each identified cross-device directed edge with a pair of send and receive nodes that are connected by a bidirectional bridge. In doing so, the system may further insert a directed edge between the send node and a respective first node, as well as insert a directed edge between the receive node and a respective second node.

In some implementations, data may be independently exchanged between operations represented by each node in a pair of send and receive nodes. In some instances, each node in a pair of send and receive nodes may represent an operation that receives, as input, an output of the operation represented by the other node in the pair communicated according to a protocol that corresponds to each hardware resource and machine to which the pair of send and receive nodes are assigned. As described above, such protocols may, for example, include RPC and RDMA.

Each send node may, for instance, represent an operation that receives, as input, an output of the operation represented by a respective first node, and provides the output of the operation represented by the respective first node, as output, to the receive node. The output of the operation represented by the respective first node may be a tensor, for example. Similarly, each receive node may represent an operation that receives, as input, the output of the operation represented by the send node, and provides the output of the operation represented by the send node, as output, to a respective second node. In some implementations, the operation represented by the receive node may further provide requests for output of the operation represented by the send node, as output, to the send node. In these implementations, the operation represented by the send node may provide the output of the operation represented by the respective first node, as output, to the receive node in response to one or more requests received from the receive node.

The system may modify the allocation to assign the send and receive nodes to devices (510). For example, a computational graph system may assign each send node to the same device as the node upstream from the send node, and likewise may assign each receive node to the same device as the node downstream from the receive node.

The system may assign operations represented by the nodes to the multiple device according to the modified allocation (512). For example, a computational graph system may request that each of multiple devices perform the operations included in a respective subgraph. In some implementations, the system may partition the computational graph into multiple subgraphs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for distributing a computation represented by a computational graph over a plurality of devices and performing the computation represented by the computational graph, the method comprising:
    obtaining data representing a computational graph, the computational graph comprising a plurality of nodes and directed edges, wherein each node represents a respective operation, and wherein each directed edge connects a respective first node to a respective second node that represents an operation that receives, as input, an output of an operation represented by the respective first node;
    obtaining data identifying an allocation of the computational graph across a plurality of devices, wherein the allocation assigns each node in the computational graph to a respective device of the plurality of devices;
    identifying one or more cross-device directed edges in the computational graph, wherein each cross-device directed edge is a directed edge that connects a respective first node to a respective second node that is assigned to a different device than the respective first node in the allocation;
    for each cross-device directed edge:
        inserting a send node between the respective first node and the respective second node in the computational graph,
        inserting a receive node between the send node and the respective second node in the operation graph, and
        modifying the allocation to assign the send node to the same device as the respective first node and the receive node to the same device as the respective second node;
    assigning the operations represented by the nodes in the computational graph to the plurality of devices according to the modified allocation; and
    causing the plurality of devices to perform the operations represented by the computational graph by performing the operations of the subgraphs assigned to the respective devices.

2. The method of claim 1, wherein:
    the send node represents an operation that (i) receives, as input, an output of the operation represented by the respective first node, and (ii) provides the output of the operation represented by the respective first node, as output, to the receive node; and
    the receive node represents an operation that (i) receives, as input, the output of the operation represented by the send node, and (ii) provides the output of the operation represented by the send node, as output, to the respective second node.

3. The method of claim 2, wherein the output of the operation represented by the respective first node is a tensor.

4. The method of claim 2, wherein:
    the operation represented by the receive node further (iii) provides requests for output of the operation represented by the send node, as output, to the send node; and
    the operation represented by the send node further (ii) provides the output of the operation represented by the respective first node, as output, to the receive node in response to one or more requests received from the receive node.

5. The method of claim 1, wherein obtaining data identifying the allocation of the computational graph across the plurality of devices comprises:
    obtaining data identifying an allocation of the computational graph across hardware resources included in one or more machines.

6. The method of claim 5, wherein each node in a pair of send and receive nodes represents an operation that receives, as input, an output of the operation represented by the other node in the pair communicated according to a protocol that corresponds to each hardware resource and machine to which the pair of send and receive nodes are assigned.

7. The method of claim 1, wherein:
    inserting the send node between the respective first node and the respective second node in the computational graph further comprises, for each cross-device directed edge:
        inserting a directed edge between the send node and the respective first node; and
    inserting the receive node between the send node and the respective second node in the operation graph further comprises, for each cross-device directed edge:
        inserting a directed edge between the receive node and the respective second node.

8. The method of claim 1, wherein data is independently exchanged between operations represented by each node in a pair of send and receive nodes.

9. The method of claim 1, wherein, during execution of the operations represented by the computational graph by the plurality of devices, the operations represented by each pair of send and receive nodes allow the plurality of devices to independently communicate inputs and outputs of operations represented by other nodes in computational graph across devices in the plurality of devices.

10. A system for distributing a computation represented by a computational graph over a plurality of devices and performing the computation represented by the computational graph, the system comprising:
one or more data processing apparatus; and
a computer-readable storage device having stored thereon instructions that, when executed by the one or more data processing apparatus, cause the one or more data processing apparatus to perform operations comprising:
obtaining data representing a computational graph, the computational graph comprising a plurality of nodes and directed edges, wherein each node represents a respective operation, and wherein each directed edge connects a respective first node to a respective second node that represents an operation that receives, as input, an output of an operation represented by the respective first node;
obtaining data identifying an allocation of the computational graph across a plurality of devices, wherein the allocation assigns each node in the computational graph to a respective device of the plurality of devices;
identifying one or more cross-device directed edges in the computational graph, wherein each cross-device directed edge is a directed edge that connects a respective first node to a respective second node that is assigned to a different device than the respective first node in the allocation;
for each cross-device directed edge:
inserting a send node between the respective first node and the respective second node in the computational graph,
inserting a receive node between the send node and the respective second node in the operation graph, and
modifying the allocation to assign the send node to the same device as the respective first node and the receive node to the same device as the respective second node;
assigning the operations represented by the nodes in the computational graph to the plurality of devices according to the modified allocation; and
causing the plurality of devices to perform the operations represented by the computational graph by performing the operations of the subgraphs assigned to the respective devices.

11. The system of claim 10, wherein:
the send node represents an operation that (i) receives, as input, an output of the operation represented by the respective first node, and (ii) provides the output of the operation represented by the respective first node, as output, to the receive node; and
the receive node represents an operation that (i) receives, as input, the output of the operation represented by the send node, and (ii) provides the output of the operation represented by the send node, as output, to the respective second node.

12. The system of claim 11, wherein the output of the operation represented by the respective first node is a tensor.

13. The system of claim 11, wherein:
the operation represented by the receive node further (iii) provides requests for output of the operation represented by the send node, as output, to the send node; and
the operation represented by the send node further (ii) provides the output of the operation represented by the respective first node, as output, to the receive node in response to one or more requests received from the receive node.

14. The system of claim 10, wherein data is independently exchanged between operations represented by each node in a pair of send and receive nodes.

15. The system of claim 10, wherein, during execution of the operations represented by the computational graph by the plurality of devices, the operations represented by each pair of send and receive nodes allow the plurality of devices to independently communicate inputs and outputs of operations represented by other nodes in computational graph across devices in the plurality of devices.

16. A non-transitory computer-readable storage device for distributing a computation represented by a computational graph over a plurality of devices and performing the computation represented by the computational graph, the storage device having instructions stored thereon that, when executed by a computing device, cause the computing device to perform operations comprising:
obtaining data representing a computational graph, the computational graph comprising a plurality of nodes and directed edges, wherein each node represents a respective operation, and wherein each directed edge connects a respective first node to a respective second node that represents an operation that receives, as input, an output of an operation represented by the respective first node;
obtaining data identifying an allocation of the computational graph across a plurality of devices, wherein the allocation assigns each node in the computational graph to a respective device of the plurality of devices;
identifying one or more cross-device directed edges in the computational graph, wherein each cross-device directed edge is a directed edge that connects a respective first node to a respective second node that is assigned to a different device than the respective first node in the allocation;
for each cross-device directed edge:
inserting a send node between the respective first node and the respective second node in the computational graph,
inserting a receive node between the send node and the respective second node in the operation graph, and
modifying the allocation to assign the send node to the same device as the respective first node and the receive node to the same device as the respective second node;
assigning the operations represented by the nodes in the computational graph to the plurality of devices according to the modified allocation; and
causing the plurality of devices to perform the operations represented by the computational graph by performing the operations of the subgraphs assigned to the respective devices.

17. The storage device of claim 16, wherein:
the send node represents an operation that (i) receives, as input, an output of the operation represented by the respective first node, and (ii) provides the output of the operation represented by the respective first node, as output, to the receive node; and the receive node represents an operation that (i) receives, as input, the output of the operation represented by the send node, and (ii) provides the output of the operation represented by the send node, as output, to the respective second node.

18. The storage device of claim 17, wherein the output of the operation represented by the respective first node is a tensor.

19. The storage device of claim 17, wherein:

the operation represented by the receive node further (iii) provides requests for output of the operation represented by the send node, as output, to the send node; and the operation represented by the send node further (ii) provides the output of the operation represented by the respective first node, as output, to the receive node in response to one or more requests received from the receive node.

20. The storage device of claim 16, wherein, during execution of the operations represented by the computational graph by the plurality of devices, the operations represented by each pair of send and receive nodes allow the plurality of devices to independently communicate inputs and outputs of operations represented by other nodes in computational graph across devices in the plurality of devices.

21. A method for distributing the operations represented by a computational graph over a plurality of devices and performing the operations represented by the computational graph, the computational graph comprising a plurality of nodes and directed edges, wherein each node represents a respective operation, wherein each directed edge connects a respective first node to a respective second node that represents an operation that receives, as input, an output of an operation represented by the respective first node, wherein the method comprises, for a first device of the plurality of devices:

receiving data representing a subgraph of the computational graph assigned to the first device, the subgraph comprising a plurality of nodes and directed edges from the computational graph; and performing the operations represented by the nodes in the subgraph, comprising:

performing an operation represented by a respective first node in the subgraph to generate a first output;

determining that the first node is connected by a directed edge to a send node in the subgraph;

performing the operation represented by the send node to transmit the first output of the operation represented by the respective first node to another device of the plurality of devices;

performing an operation represented by a receive node in the subgraph to obtain a second output from an operation represented by a second node assigned to another device in the plurality of devices;

determining that the receive node is connected by a directed edge to a third node in the subgraph; and performing an operation represented by the third node using as input the obtained second output.

* * * * *